(12) United States Patent
Naitoh

(10) Patent No.: US 6,696,693 B1
(45) Date of Patent: Feb. 24, 2004

(54) ELECTRON BEAM IRRADIATION APPARATUS AND METHOD

(75) Inventor: Yoshihiko Naitoh, Tokyo (JP)

(73) Assignee: Ebara Corporation, Tokyo (JP)

( * ) Notice: Subject to any disclaimer, the term of this patent is extended or adjusted under 35 U.S.C. 154(b) by 3 days.

(21) Appl. No.: 09/926,457
(22) PCT Filed: Jun. 30, 2000
(86) PCT No.: PCT/JP00/04331
§ 371 (c)(1), (2), (4) Date: Jan. 24, 2002
(87) PCT Pub. No.: WO01/02082
PCT Pub. Date: Jan. 11, 2001

(30) Foreign Application Priority Data

Jul. 2, 1999 (JP) ............................................. 11/189604

(51) Int. Cl.⁷ ................................................ H01J 29/70
(52) U.S. Cl. ............................. 250/492.3; 250/492.23; 250/492.1
(58) Field of Search ......................... 250/492.3, 492.23, 250/492.1, 396 R, 396 ML

(56) References Cited

U.S. PATENT DOCUMENTS

| | | | | |
|---|---|---|---|---|
| 2,058,914 A | * | 10/1936 | Rudenberg | ................... 250/311 |
| 2,907,915 A | * | 10/1959 | Gleichauf | .............. 315/368.15 |
| 3,611,005 A | * | 10/1971 | Uno et al. | ................... 315/382 |
| 4,864,195 A | * | 9/1989 | Masterton | .............. 315/368.27 |
| 5,319,211 A | * | 6/1994 | Matthews et al. | ........ 250/492.3 |
| 5,428,269 A | * | 6/1995 | Hedrick | ....................... 315/369 |
| 5,623,183 A | * | 4/1997 | Allen et al. | ................. 315/5.37 |
| 6,329,769 B1 | * | 12/2001 | Naito | .......................... 315/370 |

FOREIGN PATENT DOCUMENTS

| | | |
|---|---|---|
| DE | 36 08 291 | 4/1987 |
| JP | 61-216228 | 9/1986 |
| WO | WO 98/04336 | 2/1998 |

\* cited by examiner

Primary Examiner—John R. Lee
Assistant Examiner—Anthony Quash
(74) Attorney, Agent, or Firm—Westerman, Hattori, Daniels & Adrian, LLP

(57) ABSTRACT

An electron beam irradiation apparatus is employed for irradiating combustion exhaust gas with an electron beam to remove toxic components from the exhaust gas. The electron beam irradiation apparatus comprises an electron beam source (12) for emitting electrons, an accelerating tube (13) for accelerating the electrons emitted from the electron beam source, a focusing electromagnet (16) for controlling a diameter of an electron beam by applying a magnetic field to an electron beam having a high energy formed in the accelerating tube (13), an electromagnet (17, 18) for deflecting and scanning the electron beam by applying a magnetic field to the electron beam and an irradiation window (20) for allowing the electron beam to pass therethrough. The electron beam is focused a focus point by the focusing electromagnet (16) so that the electron beam converges once and then diverges, and then emitted through the irradiation window (20) to the outside.

12 Claims, 3 Drawing Sheets

ELECTRON BEAM IRRADIATION APPARATUS AND METHOD

TECHNICAL FIELD

The present invention relates to electron beam irradiation apparatus and method, and more particularly to electron beam irradiation apparatus and method which are employed for irradiating combustion exhaust gas discharged from thermal power stations or the like with an electron beam to remove toxic components from the exhaust gas.

BACKGROUND ART

As economy develops, more and more energy is demanded. Amidst the continuous growth of energy demand, energy source is still dependent on fossil fuels such as coal and petroleum. However, the harmful products or pollutants generated by burning of fossil fuels are responsible for global pollution. It is considered that a global issue of the global warming and the acid rain caused by air pollution is attributed to components such as SOx and NOx which are contained in combustion exhaust gas discharged from thermal power stations or the like. As a method for removing toxic components such as SOx and NOx, there has been used a method of irradiating combustion exhaust gas with an electron beam for desulfurization and denitration (i.e. removing toxic components such as SOx and NOx).

In a flue gas treatment system for treating the combustion exhaust gas by employing an electrom beam, molecules such as oxygen ($O_2$) and water vapor ($H_2O$) in the combustion exhaust gas are irradiated with the electron beam emitted from an irradiation window comprising a thin film made of Ti or the like to form radicals such as OH, O, and $HO_2$ having high oxidizing strength. These radicals oxidize toxic components such as SOx and NOx to produce sulfuric acid and nitric acid as intermediate products. These intermediate products react with ammonia gas ($NH_3$) previously injected into the exhaust gas to produce ammonium sulfate and ammonium nitrate which are recovered as materials for fertilizer. Therefore, such a system for treating exhaust gas can remove toxic components such as SOx and NOx from the combustion exhaust gas and simultaneously recover ammonium sulfate and ammonium nitrate as useful by-products used for materials for fertilizer.

FIG. 3 shows an electron beam irradiation apparatus used for the above flue gas treatment system according to an example.

The electron beam irradiation apparatus 11 mainly comprises a thermoelectron generator 12 comprising a filament or the like, an accelerating tube 13 for accelerating electrons emitted from the thermoelectron generator 12, a focusing electromagnet 16 for controlling a diameter of the electron beam by applying the magnetic field to the high-energy electron beam formed in the accelerating tube 13, and scanning electromagnets 17, 18 for deflecting the electron beam in x and y directions by applying the magnetic field to the electron beam whose diameter has been controlled by the focusing electromagnet 16. The x direction is a horizontal direction shown in FIG. 3, and the y direction is a direction perpendicular to the x direction and also perpendicular to the sheet surface of FIG. 3. A surrounding comprising a container 19 and an irradiation window 20 is provided, and the interior of the surrounding is kept under high vacuum condition in the range of $1.33 \times 10^{-3}$ to $1.33 \times 10^{-4}$ Pa ($10^{-5}$ to $10^{-6}$ Torr). The high-energy electron beam formed by the accelerating tube 13 is deflected and scanned by the scanning electromagnets 17, 18 which apply the magnetic field to the electron beam, and emitted through the irradiation window 20 into a certain range of an exhaust gas passage (not shown in FIG. 3) located at the outside.

Thermoelectrons generated by the thermoelectron generator 12 comprising a filament or the like are accelerated by high-voltage of about 800 kV, for example, in the accelerating tube 13 to cause a high-speed electron beam to be formed. Then, a beam diameter of the electron beam is controlled by the focusing electromagnet 16 to thus form a linear electron beam, having substantially the same diameter in a travelling direction in an example shown in FIG. 3, which is then directed toward the magnetic field formed by the scanning electromagnets 17, 18. The focusing electromagnet 16 comprises an electromagnet having a ring-shaped coil disposed around an axis of the electromagnet, and forms a magnetic field which is symmetric with respect to the axis of the electron beam. The beam diameter of the electron beam is controlled by magnitude and direction of the magnetic field. In other words, focusing of the electron beam is controlled by magnitude and direction of the magnetic field. Therefore, direct current $I_0$ is supplied to the coil of the electromagnet, and the degree of convergence or divergence of the electron beam is adjusted by magnitude of the direct current $I_0$.

The electron beam whose diameter has been controlled by the focusing electromagnet 16 is scanned in the x and y directions by the scanning electromagnets 17, 18. The scanning electromagnet 17 comprises an electromagnet having a pair of poles for deflecting the electron beam in the y direction, and the scanning electromagnet 18 comprises an electromagnet having a pair of poles for deflecting the electron beam in the x direction. By controlling magnitude and direction of current supplied to the coils of the scanning electromagnets 17, 18, angles of deflection in the x and y directions are controlled, and hence the electron beam is scanned and the irradiation position of the electron beam is controlled. In an example, the electron beam is scanned in the y direction (latitudinal direction) using rectangular wave in the scanning electromagnet 17, and the electron beam is scanned in the x direction (longitudinal direction) using sine wave in the scanning electromagnet 18.

However, when the electron beam is scanned in the x direction by the scanning electromagnet 18, if the angle of deflection is large in the vicinity of maximum scanning positions A, B corresponding to both scanning ends, the electron beam is deflected by the magnetic field produced by the electromagnet, so that an angle of outgoing electron beam differs according to an angle of incidence of the electron beam. Therefore, the electron beam converges at the irradiation window portions A, B corresponding to the maximum scanning positions A, B due to a lens effect created by a convex lens or the like. Specifically, as shown in the irradiation window portions A, B and C of FIG. 3, while the beam diameter is about 10 cm, for example, at the central position C, the beam diameter is about 5 cm, for example, at the maximum scanning positions A, B corresponding to both scanning ends. Thus, the irradiation area of the electron beam is remarkably converged at the maximum scanning positions A, B. The irradiation window 20 comprises a thin film made of titanium (Ti), and hence if the electron beam converges at the maximum scanning positions A, B or thereabouts, then energy density of the electron beam is increased thereat, causing damage to the irradiation window.

Further, areas where irradiation of the electron beam is not made are formed at the maximum scanning positions A, B or thereabouts, and hence toxic components in the combustion exhaust gas cannot be sufficiently removed.

DISCLOSURE OF INVENTION

It is therefore an object of the present invention to provide electron beam irradiation apparatus and method which can prevent an electron beam from being converged at a maximum scanning position and can stably obtain an irradiation area having a uniform energy density where irradiation of the electron beam is uniformly performed.

According to an aspect of the present invention, there is provided an electron beam irradiation apparatus, comprising: an electron beam source for emitting electrons; an accelerating tube for accelerating the electrons emitted from the electron beam source; a focusing electromagnet for controlling a diameter of an electron beam by applying a magnetic field to an electron beam having a high energy formed in the accelerating tube; an electromagnet for deflecting and scanning the electron beam by applying a magnetic field to the electron beam; and an irradiation window for allowing the electron beam to pass therethrough; wherein the electron beam is focused at a focus point by the focusing electromagnet so that the electron beam converges once and then diverges, and then emitted through the irradiation window to the outside.

According to the present invention, the electron beam converges once at the focus point and then diverges, and then is emitted through the irradiation window to the outside. Therefore, the beam diameter of the electron beam can be enlarged at the irradiation window. The beam diameter of the electron beam which has focused tends to be larger at the positions A, B having a large angle of deflection than that at the central position C. Thus, since the beam diameter of the electron beam is sufficiently enlarged at the maximum scanning positions (maximum angle of deflection), the convergence of the electron beam at the irradiation window portion can be prevented. Therefore, the irradiation density of the electron beam at the irradiation window portion can be uniformized to thus prevent the irradiation window portion from being damaged. Further, the electron beam is uniformly emitted through the irradiation window portion to allow combustion exhaust gas to be uniformly irradiated with the electron beam, thus removing toxic components sufficiently from the exhaust gas.

It is desirable to position the prefucus point where the electron beam converges once and then diverges at a location after the electron beam passes through the magnetic field for deflecting and scanning the electron beam in a travelling direction of the electron beam. Thus, in the case where the accelerating energy of the electron beam is so large as to be about 800 kV and the velocity of the electron beam is close to the light velocity, the electron beam becomes relativistic electron beam (REB). The present invention is applicable to such electron beam. Therefore, even if an angle of deflection is large, the beam diameter having a sufficient expansion at the irradiation window portion can be obtained.

It is desirable that the location of the focus point is adjusted by controlling current value supplied to the focusing electromagnet. Thus, by a relatively simple means for adjusting current value supplied to the focusing electromagnet, the beam diameter having a sufficient expansion at the maximum scanning position on the irradiation window portion can be obtained.

According to another aspect of the present invention, an electron beam irradiation method, comprising: controlling a diameter of an electron beam having a high energy by applying a magnetic field to the electron beam; deflecting and scanning the electron beam whose diameter has been controlled by applying a magnetic field to the electron beam with a focusing electromagnet; and emitting the electron beam through an irradiation window to the outside; wherein the electron beam is focused at a focus point by the focusing electromagnet so that the electron beam converges once and then diverges, and then emitted through the irradiation window to the outside.

With the above arrangement, even if the electron beam having a high energy is scanned at a relatively large angle of deflection, the convergence of the electron beam can be avoided, and irradiation of the electron beam can be carried out in a uniform energy density over a wide scanning area. Thus, the electron beam having a uniform energy density can be supplied to a relatively large irradiation area in an electron beam irradiation apparatus for treating flue gas, or the like. Further, a relatively large angle of deflection of the electron beam can be permitted to thus contribute to downsizing of the apparatus.

BEST MODE FOR CARRYING OUT THE INVENTION

Figure 1:
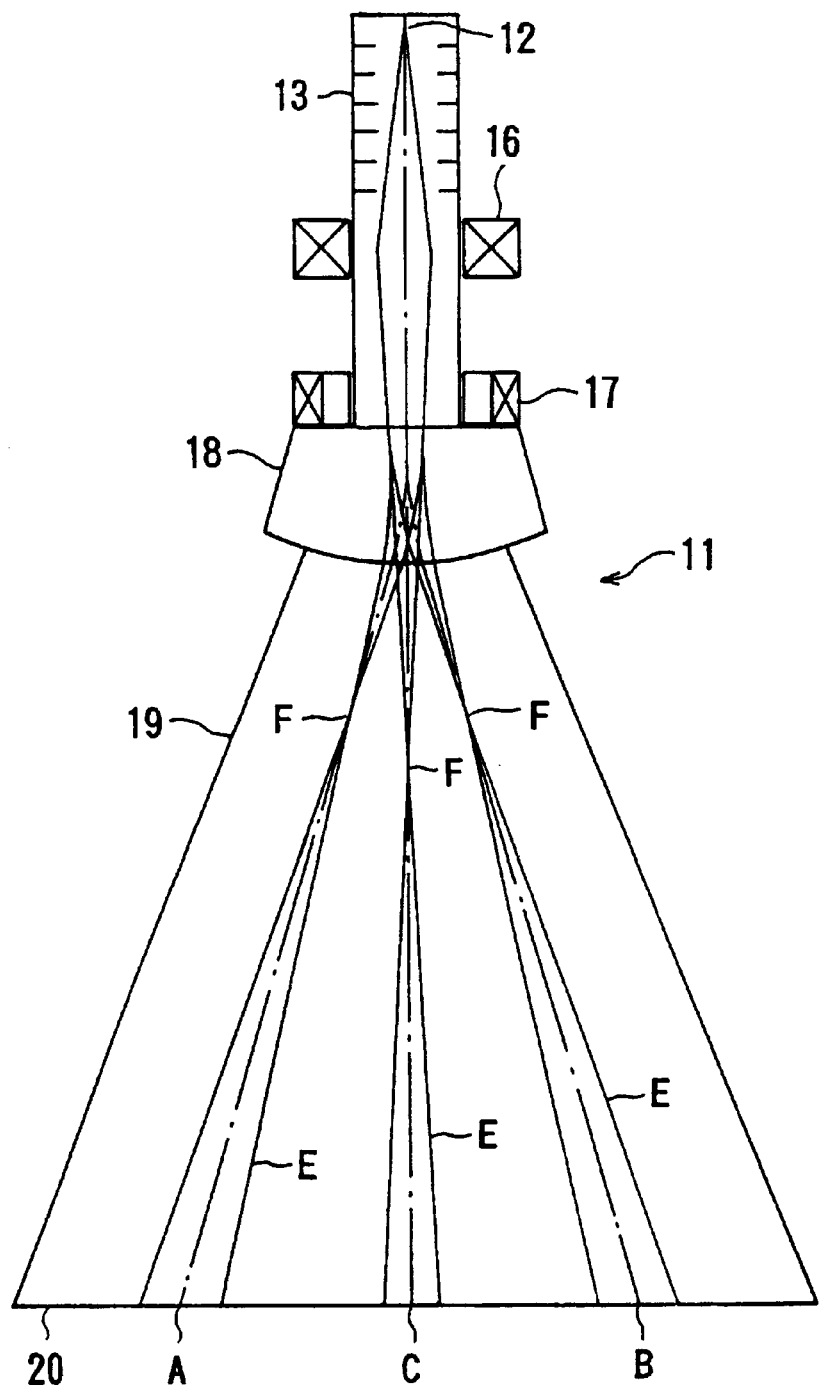
FIG. 1 is a schematic view showing the manner in which electron beam is converged and diverged in an electron beam irradiation apparatus according to an embodiment of the present invention.
Figure 1:
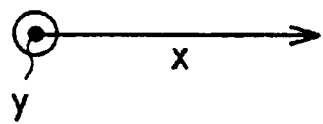

An electron beam irradiation apparatus and method according to an embodiment of the present invention will be described below with reference to FIG. 1. Like or corresponding parts are denoted by like or corresponding reference numerals throughout views.

As shown in FIG. 1, an electron beam irradiation apparatus 11 comprises a thermoelectron generator 12, an accelerating tube 13, a focusing electromagnet 16, and scanning electromagnets 17, 18, whereby the electron beam is accelerated and scanned, and then emitted through an irradiation window 20 into a certain range of an exhaust gas passage located at the outside. This structure of the electron beam irradiation apparatus 11 is the same as that of the conventional apparatus. Further, the electron beam is accelerated to a high-speed by high-voltage of about 800 kV in the accelerating tube 13, and a beam diameter of the electron beam is controlled by the focusing electromagnet 16, and then the electron beam whose diameter has been controlled is deflected and scanned by the scanning electromagnets 17, 18. This structure is also the same as the conventional apparatus. As a scanning width, the scanning length in the longitudinal direction (x direction) is in the range of 3 to 4 m, and the scanning length in the latitudinal direction (y direction) is in the range of 60 to 40 cm.

In the electron beam irradiation apparatus of the present invention, direct current $I_0$ supplied to the focusing electromagnet 16 is adjusted such that before the electron beam reaches the irradiation window 20, the electron beam is focused for thereby forming a sufficient expansion when the electron beam reaches the irradiation window 20. Specifically, by making the direct current $I_0$ supplied to the focusing electromagnet 16 larger, as shown in FIG. 1, the focus of the electron beam is adjusted so that the electron beam E converges at a focus point F to a maximum degree after the electron beam passes through the main magnetic field produced by the scanning electromagnet 18. That is, the beam diameter of the electron beam E becomes the smallest at the focus point F. Therefore, after the electron beam E passes through the focus point F, the electron beam E diverges to enlarge the beam diameter sufficiently and reaches the irradiation window 20. Thereafter, the electron beam E is emitted through the irradiation window 20 comprising a Ti foil into a certain range of the exhaust gas passage, thus performing desulfurization or denitrozation of the exhaust gas.

Figure 3:
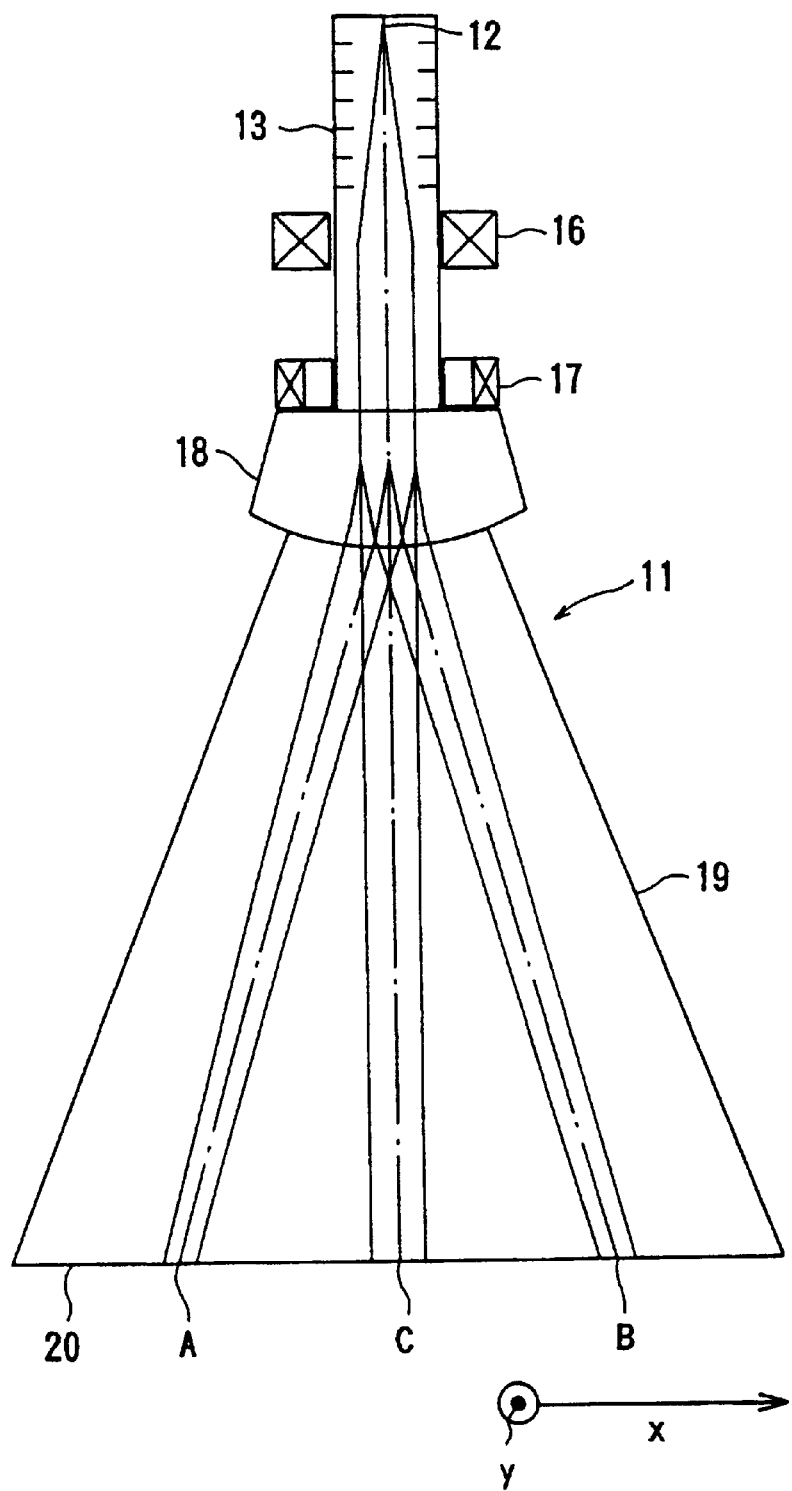
FIG. 3 is a schematic view showing the manner in which electron beam is converged and diverged in a conventional electron beam irradiation apparatus.

The beam diameter of the electron beam E is about 10 cm which is the same as that of a linear electron beam obtained by the conventional apparatus shown in FIG. 3. At the maximum scanning positions A, B on the irradiation window 20, the beam diameter of the electron beam E is equal to or larger than 10 cm. The position of the focus point F can be adjusted by magnitude of the direct current $I_0$, whereby the beam diameter can be suitably adjusted at the irradiation window 20.

It is confirmed by various experiments that when flux density of the magnetic field produced by the scanning electromagnet 18 is zero, it is preferable to position the focus point F at a location after the electron beam passes through the magnetic field produced by the scanning electromagnet 18. Accordingly, the entrance angle of the electron beam into the magnetic field produced by the scanning electromagnets 17, 18 is preferably controlled, and the outgoing angle of the electron beam out of the magnetic field is also preferably controlled after circulating motion therein. Therefore, the convergence and divergence of the electron beam can be carried out well at the focus point F.

According to the embodiment of the present invention, the energy of electron beam required for the electron beam irradiation apparatus in the flue gas treatment system is about 800 kV, and the electron beam has a high velocity close to the light velocity and is called relativistic electron beam. The velocity of the electron beam is expressed by the following formula (1):

$$\frac{v}{c} = \left[ 1 - \frac{1}{\left(1 + \frac{ev}{m_0 c^2}\right)^2} \right]^{\frac{1}{2}} \quad (1)$$

where e represents electric charge of an electron equal to $1.6 \times 10^{-19}$ C, $m_0$ represents electron mass equal to $9.1 \times 10^{-31}$ kg, and c represents light velocity equal to $3 \times 10^8$ m/s.

Therefore, an electron accelerated by high-voltage of 800 kV has a velocity v expressed using the light velocity (c) in the following:

$$V/c \approx 0.92$$

In the relativistic electron beam having a high velocity also, by positioning the focus point F at the above-mentioned location, the beam diameter of the electron beam at the irradiation window 20 can be enlarged to a suitable size. In the relativistic electron beam also, the beam diameter of the electron beam is larger at the maximum scanning positions A, B than that at the central position C.

Therefore, the convergence of the electron beam at the maximum scanning positions A, B can be prevented, damage to the irradiation window can be prevented, and the electron beam having a uniform energy density can be supplied over the entire irradiation area.

Figure 2:
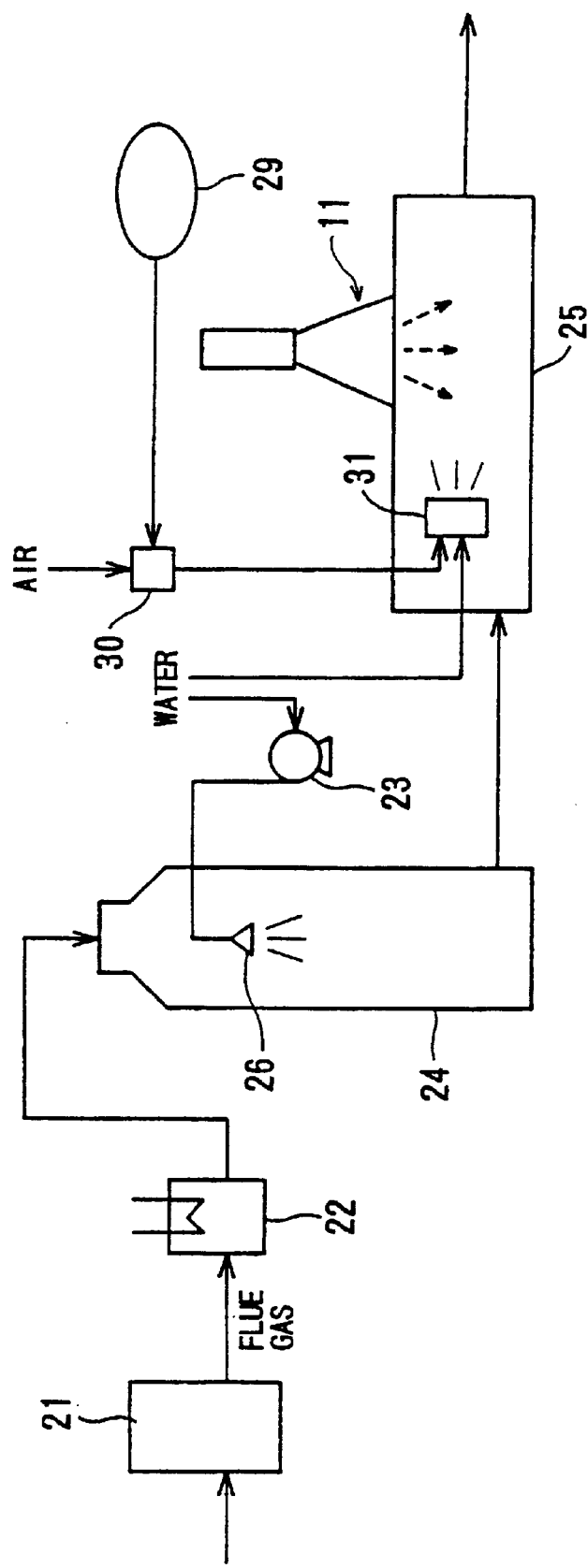
FIG. 2 is a schematic view of a flue gas treatment system in which the electron beam irradiation apparatus shown in FIG. 1 is incorporated.

FIG. 2 shows a flue gas treatment system incorporating the electron beam irradiation apparatus of the present invention in which flue gas discharged from a fuel combustion facility such as a thermal power station is treated by irradiation of electron beam. As shown in FIG. 2, flue gas discharged from a thermal power station 21 which is a kind of fuel combustion facility is cooled in a heat exchanger 22, and then introduced into a cooling tower 24. In the cooling tower 24, water supplied from a pump 23 is sprayed by a fluid nozzle 26, and the sprayed water is evaporated therein. The flue gas is cooled to a certain range of temperature in the cooling tower 24, and then the cooled gas is introduced into a process vessel 25.

On the other hand, ammonia supplied from an ammonia supply equipment 29 is mixed with air in a line mixer 30. The mixed gas and water supplied from a water supply source (not shown) are mixed in a gas-liquid mixing room of a two-fluid nozzle 31, and sprayed at the entrance of the process vessel 25. The mixture of the gas and water are irradiated with an electron beam from the electron beam irradiation apparatus 11 shown in FIG. 1.

In the above embodiment, the electron beam irradiation apparatus for treating flue gas is described. However, the essence of the present invention lies in that the convergence of the electron beam caused by a large angle of deflection when the electron beam is scanned can be avoided. Therefore, the present invention is applicable to various apparatuses, including an electron beam welding apparatus, a scanning electron microscope and the like, which utilize an electron beam.

As described above, according to the present invention, even if a high-energy electron beam is scanned at a relatively large angle of deflection, the convergence of the electron beam can be avoided, and irradiation of the electron beam can be carried out in a uniform energy density over a wide scanning area.

INDUSTRIAL APPLICABILITY

The present invention relates to electron beam irradiation apparatus and method, and is applicable to a flue gas treatment system for treating flue gas discharged from a fuel combustion facility such as a thermal power station, an electron beam welding apparatus, or a scanning electron microscope.

What is claimed is:

1. An electron beam irradiation apparatus, comprising:
   an electron beam source for emitting electrons;
   an accelerating tube for accelerating said electrons emitted from said electron beam source;
   a focusing electromagnet for controlling the size of a diameter of an electron beam by applying a magnetic field to an electron beam having a high energy formed in said accelerating tube;
   an electromagnet for deflecting and scanning said electron beam by applying a magnetic field to said electron beam; and
   an irradiation window for allowing said electron beam to pass therethrough,
   wherein said electron beam is focused at a focus point by said focusing electromagnet so that said electron beam converges once and then diverges, and then emitted through said irradiation window to the outside.

2. An electron beam irradiation apparatus according to claim 1, wherein said focus point of said electron beam is positioned at a location after said electron beam passes through said magnetic field for scanning said electron beam.

3. An electron beam irradiation apparatus according to claim 2, wherein said location of said focus point is adjusted by controlling current value supplied to said focusing electromagnet.

4. An electron beam irradiation method, comprising the steps of:

controlling the size of a diameter of an electron beam having a high energy by applying a magnetic field to said electron beam;

deflecting and scanning said electron beam whose diameter has been controlled by applying a magnetic field to said electron beam with a focusing electromagnet; and emitting said electron beam through an irradiation window to the outside, wherein said electron beam is focused at a focus point by said focusing electromagnet so that said electron beam converges once and then diverges, and then emitted through said irradiation window to the outside.

5. An electron beam irradiation method according to claim 4, wherein said focus point of said electron beam is positioned at a location after said electron beam passes through said magnetic field for scanning said electron beam.

6. An electron beam irradiation method according to claim 5, wherein said location of said focus point is adjusted by controlling current value supplied to said focusing electromagnet.

7. An electron beam irradiation apparatus, comprising:

an electron beam source for emitting electrons;

an accelerating tube for accelerating said electrons emitted from said electron beam source;

a focusing electromagnet for controlling a diameter of an electron beam by applying a magnetic field to an electron beam having a high energy formed in said accelerating tube so as to enlarge said diameter of an electron beam at a maximum scanning positions in relation to a central position of said electron beam;

an electromagnet for deflecting and scanning said electron beam by applying a magnetic field to said electron beam; and an irradiation window for allowing said electron beam to pass therethrough, wherein said electron beam is focused at a focus point by said focusing electromagnet so that said electron beam converges once and then diverges, and then emitted through said irradiation window to the outside.

8. An electron beam irradiation apparatus according to claim 7, wherein said focus point of said electron beam is positioned at a location after said electron beam passes through said magnetic field for scanning said electron beam.

9. An electron beam irradiation apparatus according to claim 8, wherein said location of said focus point is adjusted by controlling current value supplied to said focusing electromagnet.

10. An electron beam irradiation method, comprising:

controlling a diameter of an electron beam having a high energy by applying a magnetic field to said electron beam so as to enlarge said diameter of an electron beam at a maximum scanning positions in relation to a central position of said electron beam;

deflecting and scanning said electron beam whose diameter has been controlled by applying a magnetic field to said electron beam with a focusing electromagnet; and emitting said electron beam through an irradiation window to the outside, wherein said electron beam is focused at a focus point by said focusing electromagnet so that said electron beam converges once and then diverges, and then emitted through said irradiation window to the outside.

11. An electron beam irradiation method according to claim 10, wherein said focus point of said electron beam is positioned at a location after said electron beam passes through said magnetic field for scanning said electron beam.

12. An electron beam irradiation method according to claim 11, wherein said location of said focus point is adjusted by controlling current value supplied to said focusing electromagnet.

* * * * *